UNITED STATES PATENT OFFICE.

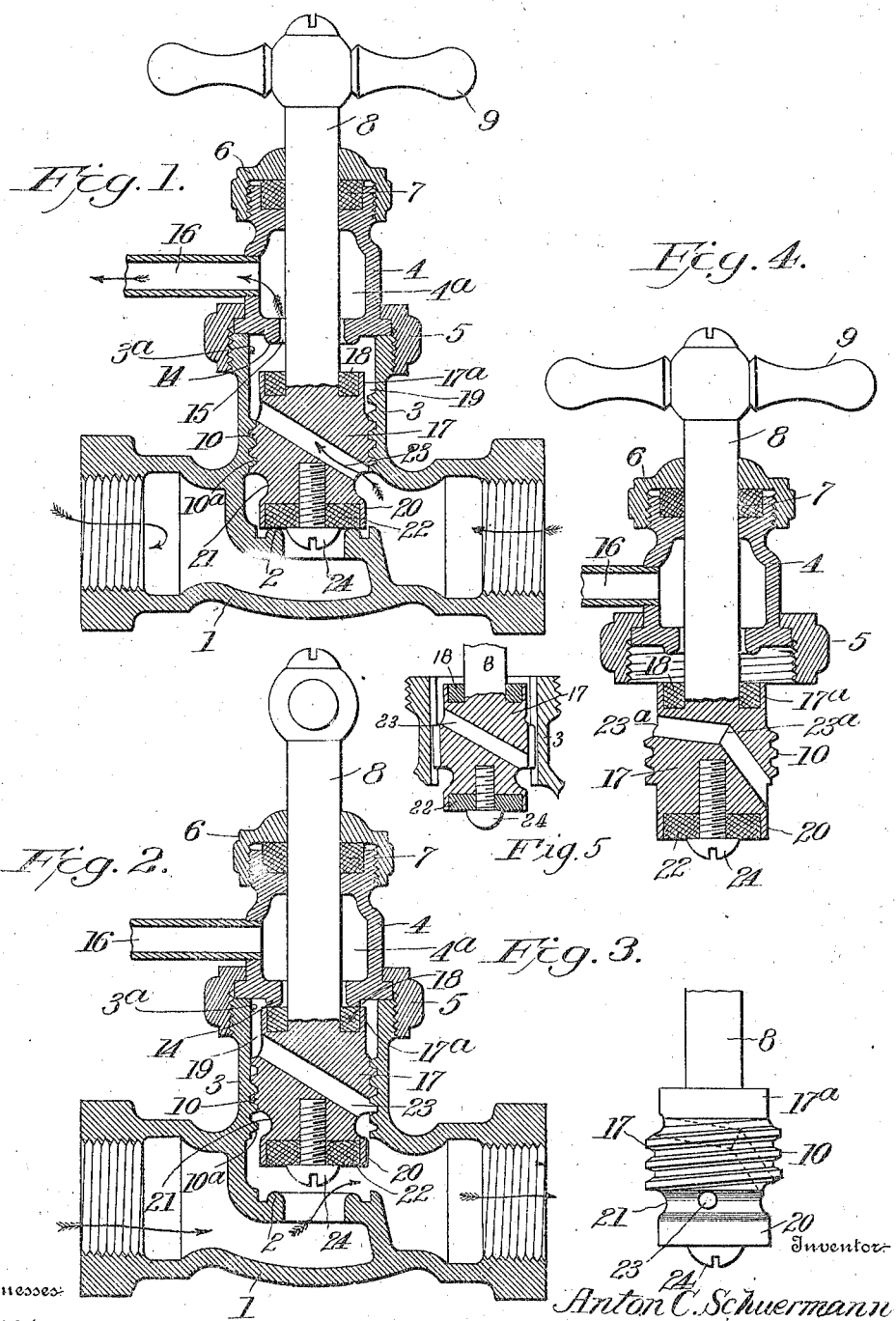

ANTON C. SCHUERMANN, OF DECATUR, ILLINOIS, ASSIGNOR TO H. MUELLER MANUFACTURING COMPANY, OF DECATUR, ILLINOIS, A CORPORATION OF ILLINOIS.

COMPRESSION STOP AND WASTE.

951,660.   Specification of Letters Patent.   Patented Mar. 8, 1910.

Application filed July 30, 1907. Serial No. 386,178.

*To all whom it may concern:*

Be it known that I, ANTON C. SCHUERMANN, a citizen of the United States, and resident of Decatur, Macon county, State of Illinois, have invented certain new and useful Improvements in Compression Stops and Wastes; and my preferred manner of carrying out the invention is set forth in the following full, clear, and exact description, terminating with claims particularly specifying the novelty.

The invention is applicable to stop and waste cocks or faucets, to hydrants, and to any other appliances that act on the stop-and-waste-principle.

The principal object of the present invention is to do away with the necessity for cutting through any threads in order to form the waste channel, and yet so construct the parts that they are not increased in size—thereby saving metal and labor, securing beauty of design and convenience in handling, reducing cost, and still not impairing the successful operation of the whole.

The invention is exemplified in the structure hereinafter described, and it is defined in the appended claims.

In the drawings forming part of this specification, Figure 1 is a central sectional view with the main valve closed and the waste valve open. Fig. 2 is a similar section with the parts in their opposite position. Fig. 3 is a side elevation of the stem and plunger removed. Fig. 4 is a section of parts showing a modification. Fig. 5 is a detail view of a modification.

In the drawings the numeral 1 designates the body of the cock which is here shown as of inverted T shape with a through passage across its head interrupted by a partition having a valve seat 2, and 3 is a lateral cylindrical extension whose axis alines with that of the seat. The cap or bonnet 4 having interior waste chamber 4ª is connected in any suitable manner with the extension 3, and as here shown a coupling nut 5 is swiveled on one member and threaded onto the other—suitable packing being interposed between the members if desired. The waste valve seat 14 is preferably formed within and as a part of the cap 4, and is herein shown as surrounding the stem with an annular space 15 between them which forms part of the waste passage and communicates through the chamber 4ª with the waste outlet 16. Above the waste valve seat and preferably at the upper end of the cap 4 is located packing 7 which is compressed by a packing nut 6.

A valve stem 8 extends through the nut 6 and packing 7, loosely through the seat 14 so as to form the space 15, and into the extension 3, where it is secured to or integral with an enlarged plug or plunger 17 which has exterior guides, here shown as threads 10 engaging interior guides, here also threads 10ª within the lower part of the extension. At the upper part of the latter these threads are omitted so as to form an enlarged smooth bore 3ª for a purpose described below.

The main valve 22 is here shown as a disk held by a screw 24 within a shell 20 at the lower end of the plug, and of reduced exterior diameter; and the waste valve 18 is in this instance a ring held within a shell 17ª at the upper end of the plug, and also of reduced diameter so that between its outer surface and the inner surface 3ª of the enlarged smooth bore of the extension 3 there is a space 19 which when the plug is lowered as in Fig. 1 allows free access of the waste to the space 15 and outlet 16. Above the shell of the main valve the plug may be exteriorly reduced as at 21 to form a neck, but this feature is unnecessary if the outer surface of this shell at a point where the passage 23 enters is always out of contact with the threads 10ª when wasting. The object of reducing the diameter of the plug has been hereinbefore set forth.

The waste passage 23 is shown as a hole bored obliquely through the plug from the neck 21 to where it opens into the space 19. By preference this hole is straight as shown, so that it may be easily drilled, but if it is desired to clear the tip of the screw 24 or any other reason should exist, the hole might be bored from each end with an angle between its extremities as indicated at 23ª in Fig. 4, or in any other way; and hence I do not limit myself to the shape and size of this hole, nor even to but one such hole, so long as its extremities communicate with the reduced ends of the plug, whether the narrow neck 21 is used or not. It will be obvious that to drill the hole through the plug in this manner is simpler than to cut a groove in the threads on the plug or within the extension, or both, and it leaves less chance for wear or for the obstruction of parts.

In the operation of the complete device, the main valve stands closed as shown in Fig. 1 and the waste liquid under waste pressure only is flowing upward through the hole 23, space 19, passage 15, through the waste valve chamber 4ª, and out the waste exit 16. When the handle 9 is turned in proper direction to open the main valve, the plug is drawn upward until the waste valve closes against its seat as shown in Fig. 2, and while this may not close the lower end of the hole 23 it does shut off the initial pressure from the waste.

The construction herein illustrated permits the omission of the reduced neck 21, because as shown in Fig. 1 the lower end of the waste passage 23 communicates with the outlet side of the through passage in the head of the body 1.

It is quite within the possibilities of this invention that the plunger may be moved by other means than the stem and handle shown in Fig. 1. For instance, the stem might be longitudinally movable, with its lower end swiveled in the plunger. In fact, it is not absolutely essential that the plunger shall rotate, so long as it has movement in and is guided within the body extension so as to open one valve and close the other at either extreme of its movement. For instance, the threads which constitute the guides might be grooves in the extension to be engaged by ribs on the plunger, the latter being formed as in Fig. 5, and then any suitable means could be employed for moving the latter in its guides. Furthermore, I do not limit myself to placing the valves on the plunger and the seats in the body, as this arrangement might be reversed at either end although I prefer the construction shown. In brief, the gist of the present invention lies in forming the waste passage through the plunger by coring out a hole on a line which occupies a general oblique direction between its extremities, and either reducing the diameter of the plunger opposite the ends of said passage or increasing the size of the body at those points, or both, so as to permit the waste to flow through such passage as has been herein described.

What is claimed as new is;

1. In a compression stop and waste, the combination with a body having a through passage provided with a main valve seat, and an extension in line with said seat having internal threads for a portion of its length and an enlarged smooth bore at its outer end; of a cap having a waste outlet and provided with a waste valve seat, a plunger having exterior threads engaging those in the extension and reduced in diameter at its upper end and reduced in diameter at its lower end to form a neck, a main valve at the lower end and a waste valve at the upper end of the plunger, means for operating it to control these valves, the plunger having a waste passage leading obliquely through it from a point in said neck below its threads to a point in the reduced portion of the plunger above its threads opposite the enlarged bore of the extension.

2. In a compression stop and waste, the combination with a body having a through passage provided with a main valve seat, and an extension in line with said seat having internal threads for a portion of its length and an enlarged smooth bore at its outer end; of a cap having a waste outlet and provided with a waste valve seat, a plunger having exterior threads engaging those in the extension and reduced in diameter at its upper end, a main valve at the lower end and a waste valve at the upper end of the plunger, means for operating it to control these valves, the plunger having a waste passage leading obliquely through it from a point below its threads which registers with the outlet when the main valve is closed, to a point in the reduced portion of the plunger above its threads opposite the enlarged bore of the extension.

3. In a compression stop and waste, the combination with a body having a through passage provided with a main valve seat, and an extension in line with said seat having internal threads for a portion of its length and an enlarged smooth bore at its outer end; of a cap having a waste outlet and provided with a waste valve seat, a plunger having exterior threads engaging those in the extension and reduced in diameter at its lower end to form a neck, a main valve at the lower end and a waste valve at the upper end of the plunger, means for operating it to control these valves, the plunger having a waste passage leading obliquely through it from a point in said neck below its threads to a point in the plunger above its threads opposite the enlarged bore of the extension.

4. In a compression stop and waste, the combination with a body having a through passage provided with a main valve seat, and an extension in line with said seat having internal threads for a portion of its length and an enlarged smooth bore at its outer end; of a cap having a waste outlet and provided with a waste valve seat, a plunger having exterior threads engaging those in the extension, a main valve at the lower end and a waste valve at the upper end of the plunger, means for operating it to control these valves, the plunger having a waste passage leading obliquely through it from a point below its threads which registers with the outlet when the main valve is closed to a point in the plunger above its threads opposite the enlarged bore of the extension.

5. In a compression stop and waste, the combination with a body having a through passage provided with a main valve seat, and an extension in line with said seat having internal threads; of a cap having a waste outlet and provided with a waste valve seat, a plunger having exterior threads engaging those in the extension and reduced in diameter at its upper end and reduced in diameter at its lower end to form a neck, a main valve at the lower end and a waste valve at the upper end of the plunger, means for operating it to control these valves, the plunger having a waste passage leading obliquely through it from a point in said neck below its threads to a point in the reduced portion of the plunger above its threads.

6. In a compression stop and waste, the combination with a body having a through passage provided with a main valve seat, and an extension in line with said seat having internal threads; of a cap having a waste outlet and provided with a waste valve seat, a plunger having exterior threads engaging those in the extension and reduced in diameter at its upper end, a main valve at the lower end and a waste valve at the upper end of the plunger, means for operating it to control these valves, the plunger having a waste passage leading obliquely through it from a point below its threads which registers with the outlet when the main valve is closed to a point in the reduced portion of the plunger above its threads.

7. In a compression stop and waste, the combination with a body having a through passage provided with a main valve seat, and an extension in line with said seat having internal guides; of a cap having a waste outlet and provided with a waste valve seat, a plunger having exterior guides engaging those in the extension and reduced in diameter at its upper end and reduced in diameter at its lower end to form a neck, a main valve at the lower end and a waste valve at the upper end of the plunger, means for operating it to control these valves, the plunger having a waste passage leading obliquely through it from a point in said neck below its guides to a point in the reduced portion of the plunger above its guides.

8. In a compression stop and waste, the combination with a body having a through passage provided with a main valve seat, and an extension in line with said seat having internal guides for a portion of its length and an enlarged smooth bore at its outer end; of a cap having a waste outlet and provided with a waste valve seat, a plunger having exterior guides engaging those in the extension, a main valve at the lower end and a waste valve at the upper end of the plunger, means for operating it to control these valves, the plunger having a waste passage leading obliquely through it from a point below its guides which registers with the outlet when the main valve is closed to a point in the plunger above its guides opposite the enlarged bore of the extension.

9. In a compression stop and waste, the combination with a body having a through passage provided with a main valve seat, and an extension in line with said seat having internal guides for a portion of its length and an enlarged smooth bore at its outer end; of a cap having a waste outlet and provided with a waste valve seat, a plunger having exterior guides engaging those in the extension, a main valve at the lower end and a waste valve at the upper end of the plunger, means for operating it to control these valves, the plunger having a waste passage leading obliquely through it from a point below its guides to a point in the plunger above its guides opposite the enlarged bore of the extension.

10. In a compression stop and waste, a body containing a valve seat and provided with a hollow lateral extension having a valve seat at the entrance to a waste passageway leading from said extension, a plunger longitudinally movable within said extension and spaced from the wall thereof, guiding means between said plunger and the inner wall of said extension, said plunger having a passageway therethrough between opposite ends of the guideways, and a valve on each end of the plunger to engage the valve seats respectively and alternately when the plunger is operated.

In testimony whereof I have hereunto subscribed my signature this the 26th day of July, A. D. 1907.

ANTON C. SCHUERMANN.

Witnesses:
HENRY MUELLER,
PHILIP MUELLER.